Patented Dec. 24, 1940

2,226,518

UNITED STATES PATENT OFFICE 2,226,518

PREPARATION OF SOLID ETHERIFIED UREA-FORMALDEHYDE CONDENSATION PRODUCTS

Theodore S. Hodgins, Royal Oak, and Almon G. Hovey, Birmingham, Mich., assignors to Reichhold Chemicals, Inc., formerly Beck, Koller & Company, Inc., Detroit, Mich.

No Drawing. Application October 28, 1938, Serial No. 237,578

5 Claims. (Cl. 260—70)

The invention relates to the preparation of etherified urea-formaldehyde resins in solid plastic form, i. e. with non-volatile content substantially 100%. Urea-formaldehyde resins in solid form, capable of being re-dissolved in alcohols and aromatic hydrocarbons and, to a limited extent, in straight chain hydrocarbons, have not been heretofore described.

The advantages of concentrated urea-formaldehyde resins without the presence of solvents are obvious. (1) They may be used to build up the concentration of heat-hardening urea-formaldehyde content in an alkyd enamel or other enamels without necessitating the excessive use of butanol or other strong solvents which tend to lower the viscosity, promote lifting, etc. (2) These "concentrated" resins offer possibilities for use in varnish and enamel cooking because the volatile and inflammable solvent is not present. (3) These "concentrated" resins, which may be re-dissolved with the same original properties, are very desirable for long distance transportation, where freight on solvent is saved, and for export trade where not only the freight is a factor, but impost duties as well.

While it is obviously desirable to prepare "concentrated urea-formaldehyde resins" which may be handled without the presence of solvents, no process for preparing such products has ever been disclosed, no doubt, because of the lack of knowledge as to how to control reaction and prevent gelation when the volatile solvent has been removed.

U. S. Patent No. 2,109,291 issued February 22, 1938, describes a method of alkylating urea-formaldehyde resins in butanol solution with "complex" polyhydric alcohols, but here the final resin is in solution form and possesses only limited solubility in aromatic hydrocarbons.

We have now discovered that in order to prepare solid etherified urea-formaldehyde resins of the type described above, but substantially free from solvent, and which are capable of solution in alcohol, aromatic hydrocarbons, and to a limited extent in straight chain hydrocarbons, it is necessary to carry out the reaction in such a manner that the nitrogen content of the plastic mass is between the nitrogen content of the mono- and di-etherification products of dimethylolurea.

Heretofore, many urea-formaldehyde resins have been made in solution form, but it has not been possible to prepare the solid form by removal of solvent without gelling the resin or complete loss of solubility. However, according to the present invention, resins may be prepared in a solid form substantially free from solvents which are stable to moderate heating, i. e., 60–70° C., soluble in alcohols, aromatic hydrocarbons and to a certain extent in straight chain hydrocarbons (about 3–5 parts per 1 part of solid resin). The mechanism of the reaction betweeen urea, formaldehyde and butyl alcohol may be described as follows:

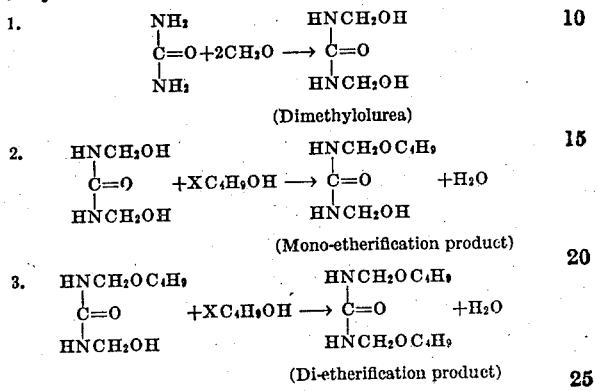

in which the calculated nitrogen content for the mono-etherification product (2) is 15.8% and that for the di-etherification product (3) is 12.07%.

In carrying the invention into practical effect, we react urea and formaldehyde to form dimethylolurea according to the usual procedure. A minimum of two molecules of butyl alcohol is added for each molecule of dimethylolurea. The pH is adjusted to 5.5–6.5 by means of phosphoric acid and the reaction mixture held at boiling until the dimethylolurea is reacted as evidenced by the change from a cloudy solution to a clear solution. At this stage the mixture is treated under vacuum of 100–200 mm. Hg at 60–70° C. whereupon a clear water-white, heat-hardening resinous product in plastic form is obtained which is capable of being redissolved in solvents such as alcohols, aromatic hydrocarbons and, to a certain extent, in straight chain hydrocarbons.

The nitrogen content of the final solid resin is intermediate between that of the mono-etherification product and the di-etherification product and is found to be 12.55%, which represents 86.7% etherification of the latter type.

As illustrative of the invention the following specific example is given:

*Example*

(a) *Preparation of heat-hardening resin*—Mix 243 parts (3 moles) of formaldehyde and 4-6 parts ammonium hydroxide (to bring pH 7.5-8.5). Agitate well; then add 60 parts (1 mole) urea. Heat to boiling (100° C.) in 1 hour, hold for 30 minutes. Add 148 parts (2 moles) of butyl alcohol and enough $H_3PO_4$ to bring pH to 5.5 and continue at boiling (100° C.) for 30 minutes more. Dehydrate the resin at 60-70° C. under vacuum at 100-200 mm. Hg at a pH 5.5-6.5.

The resin may be poured out in trays and cooled. The resin is slightly sticky and should be cooled to under 0° C. to facilitate handling (i. e. by cracking it up) or the resin may be heated in a steam chest to render the resin fluid enough to pour.

A very lightcolored resin containing no solvent is thus prepared, which is extremely reactive and heat-hardening at elevated temperatures and which is capable of being re-dissolved in solvent for cold admixture to alkyd resin enamels or other enamels. The resin may also be used for cooking processes where it is desired to react this water-white reactive resin with other ingredients, e. g. alkyd resins, castor oil, varnish bases, etc.

(b) *Preparation of heat-hardening, clear enamel.*—The solid resin described in (a) is cut in butanol or toluol to 50 or 60% solutions and applied as a surface coating by baking; for example, 30 minutes at 300° F.

(c) *Preparation of heat-hardening, white enamel.*—30 parts of a 50% resin solution described in (b) is mixed with 70 parts of a 50% solution of a short length semi- or non-drying oil modified alkyd resin in hydrocarbon solvent, and pigmented with $TiO_2$ and ZnO (95/5) and at a pigment/binder ratio 1.0/0.80 ground in a ball mill until suitably dispersed (48 hours) and thinned to spraying viscosity with mineral spirits, toluol or butanol and baked, e. g., 30 minutes at 300° F. The resulting white enamel has excellent color, gloss, adhesion, extreme hardness, and good durability.

We claim:

1. A method of preparing a solid, stable, hydrocarbon-soluble resin of the urea-formaldehyde type which consists in boiling (1) dimethylolurea derived from 1 mol of urea and at least 2 mols of aqueous formaldehyde, with (2) a minimum of 2 mols of butyl alcohol, at boiling temperature while maintaining a pH of 5.5-6.5, and dehydrating under vacuum until the nitrogen content of the plastic mass is approximately 12.55 and until a product substantially free from solvent is obtained; dehydration, condensation and advancement of the resin taking place simultaneously, and the urea, formaldehyde and alcohol comprising the principal reacting ingredients, the pH value of 5.5-6.5 being maintained throughout the etherification process.

2. A stable solid etherified resin of the urea-formaldehyde type obtained according to the process of claim 1 substantially free from any solvent, and capable of being redissolved in alcohols, in aromatic hydrocarbons, and to a limited extent, in straight chain hydrocarbons.

3. A solution of the solid resin produced according to claim 1, in a hydrocarbon solvent.

4. A method of preparing a solid stable hydrocarbon soluble urea-formaldehyde resin, which consists in initially mixing three mols of formaldehyde with a sufficient quantity of ammonium hydroxide to bring the pH within the range of 7.5-8.5, then adding one mol of urea, gradually heating to boiling within a period of about one hour, continuing the heating at boiling for about 30 minutes, then adding two mols of butyl alcohol and sufficient $H_3PO_4$ to bring the pH to 5.5, continuing the heating at 100° C. for an additional period of 30 minutes, then dehydrating the resin at 60-70° C. under 100-200 mm. of mercury at a pH of 5.5-6.5, the nitrogen content of the final resin being approximately 12.55, said urea, formaldehyde, and butanol constituting the principal reacting ingredients.

5. A stable solid etherified resin produced according to claim 4, having a nitrogen content of approximately 12.55%, substantially free from any solvent and capable of solution in alcohols, in aromatic hydrocarbons, and to a limited extent in straight chain hydrocarbons, said resin being capable of being cracked into small pieces for shipping purposes.

THEODORE S. HODGINS.
ALMON G. HOVEY.